(12) United States Patent
DeJonge

(10) Patent No.: US 11,888,401 B2
(45) Date of Patent: Jan. 30, 2024

(54) LOAD CONTROL DEVICE FOR A LIGHT-EMITTING DIODE LIGHT SOURCE

(71) Applicant: Lutron Technology Company LLC, Coopersburg, PA (US)

(72) Inventor: Stuart W. DeJonge, Riegelsville, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

(21) Appl. No.: 17/734,161

(22) Filed: May 2, 2022

(65) Prior Publication Data

US 2022/0264723 A1     Aug. 18, 2022

Related U.S. Application Data

(63) Continuation of application No. 17/135,037, filed on Dec. 28, 2020, now Pat. No. 11,324,092, which is a continuation of application No. 16/526,629, filed on Jul. 30, 2019, now Pat. No. 10,904,979.

(60) Provisional application No. 62/712,109, filed on Jul. 30, 2018.

(51) Int. Cl.
    *H05B 45/37*     (2020.01)
    *H05B 47/105*     (2020.01)
    *H02M 3/335*     (2006.01)

(52) U.S. Cl.
    CPC ... *H02M 3/33523* (2013.01); *H02M 3/33571* (2021.05); *H05B 45/37* (2020.01)

(58) Field of Classification Search
    CPC .......... H02M 3/33523; H02M 3/33571; H05B 45/37
    See application file for complete search history.

(56) References Cited

U.S. PATENT DOCUMENTS

| | | | |
|---|---|---|---|
| 8,466,628 B2 * | 6/2013 | Shearer | H05B 45/385 |
| | | | 315/219 |
| 8,492,987 B2 | 7/2013 | Nuhfer et al. | |
| 8,680,787 B2 | 3/2014 | Veskovic et al. | |

(Continued)

FOREIGN PATENT DOCUMENTS

| | | | | |
|---|---|---|---|---|
| CN | 107078644 A | * | 8/2017 | ............. G05F 1/565 |
| CN | 108702085 A | * | 10/2018 | ............. H02M 1/08 |
| GB | 2438464 A | | 11/2007 | |

*Primary Examiner* — Henry Luong
(74) *Attorney, Agent, or Firm* — Michael S. Czarnecki; Glen R. Farbanish; Philip N. Smith

(57) ABSTRACT

A load control device may utilize a feedback signal representative of an average magnitude of the load current conducted through an electrical load to control the amount of power delivered to the electrical load. The feedback signal may be generated based on a sense signal that is electrically isolated from the line voltage input of the load control device. Depending on the operational characteristics of the electrical load, the feedback signal may be generated using different techniques. In one example technique, the sense signal may be integrated and filtered to derive the feedback signal. In another example technique, the sense signal may be used in conjunction with an input power of the load control device and an efficiency parameter of the load control device to derive the feedback signal. In yet another example technique, values derived from the foregoing two techniques may be blended together to obtain the feedback signal.

17 Claims, 7 Drawing Sheets

(56) References Cited

U.S. PATENT DOCUMENTS

| | | | |
|---|---|---|---|
| 9,232,574 B2 | 1/2016 | Veskovic | |
| 9,247,608 B2 | 1/2016 | Chitta et al. | |
| 9,253,829 B2 | 2/2016 | Veskovic | |
| 9,565,731 B2 | 2/2017 | DeJonge | |
| 9,655,180 B2 | 5/2017 | Stevens, Jr. et al. | |
| 10,098,196 B2 | 10/2018 | Kober | |
| 10,251,231 B1 | 4/2019 | DeJonge et al. | |
| 10,314,129 B2 | 6/2019 | Kober et al. | |
| 2005/0269968 A1 | 12/2005 | Ito et al. | |
| 2011/0037414 A1 | 2/2011 | Wang et al. | |
| 2013/0063047 A1* | 3/2013 | Veskovic | H05B 45/385 |
| | | | 315/307 |
| 2013/0241440 A1* | 9/2013 | Gaknoki | H05B 45/10 |
| | | | 315/297 |
| 2014/0119066 A1 | 5/2014 | Lin et al. | |
| 2016/0119998 A1 | 4/2016 | Linnartz et al. | |
| 2019/0267905 A1 | 8/2019 | De Clercq et al. | |

* cited by examiner

LOAD CONTROL DEVICE FOR A LIGHT-EMITTING DIODE LIGHT SOURCE

CROSS-REFERENCE TO RELATED APPLICATION

This application is a continuation of U.S. application Ser. No. 17/135,037, filed Dec. 28, 2020; which is a continuation of U.S. application Ser. No. 16/526,629, filed on Jul. 30, 2019, now U.S. Pat. No. 10,904,979 issued Jan. 26, 2021, which claims the benefit of Provisional U.S. Patent Application No. 62/712,109, filed Jul. 30, 2018, the disclosures of which are incorporated herein by reference in their entireties.

BACKGROUND

Light-emitting diode (LED) light sources (e.g., LED light engines) are often used in place of or as replacements for conventional incandescent, fluorescent, or halogen lamps, and the like. LED light sources may comprise a plurality of light-emitting diodes mounted on a single structure and provided in a suitable housing. LED light sources are typically more efficient and provide longer operational lives as compared to incandescent, fluorescent, and halogen lamps. In order to illuminate properly, an LED driver control device (e.g., an LED driver) may be coupled between an alternating-current (AC) source and the LED light source for regulating the power supplied to the LED light source. The LED driver may regulate either the voltage provided to the LED light source to a particular value, the current supplied to the LED light source to a specific peak current value, or may regulate both the current and voltage.

LED light sources are typically rated to be driven via one of two different control techniques: a current load control technique or a voltage load control technique. An LED light source that is rated for the current load control technique is also characterized by a rated current (e.g., approximately 350 milliamps) to which the peak magnitude of the current through the LED light source should be regulated to ensure that the LED light source is illuminated to the appropriate intensity and color. In contrast, an LED light source that is rated for the voltage load control technique is characterized by a rated voltage (e.g., approximately 15 volts) to which the voltage across the LED light source should be regulated to ensure proper operation of the LED light source. Typically, each string of LEDs in an LED light source rated for the voltage load control technique includes a current balance regulation element to ensure that each of the parallel legs has the same impedance so that the same current is drawn in each parallel string.

The light output of an LED light source can be dimmed. Different methods of dimming LEDs include a pulse-width modulation (PWM) technique and a constant current reduction (CCR) technique. Pulse-width modulation dimming can be used for LED light sources that are controlled in either a current or voltage load control mode/technique. In pulse-width modulation dimming, a pulsed signal with a varying duty cycle is supplied to the LED light source. If an LED light source is being controlled using the current load control technique, the peak current supplied to the LED light source is kept constant during an on time of the duty cycle of the pulsed signal. However, as the duty cycle of the pulsed signal varies, the average current supplied to the LED light source also varies, thereby varying the intensity of the light output of the LED light source. If the LED light source is being controlled using the voltage load control technique, the voltage supplied to the LED light source is kept constant during the on time of the duty cycle of the pulsed signal in order to achieve the desired target voltage level, and the duty cycle of the load voltage is varied in order to adjust the intensity of the light output. Constant current reduction dimming is typically only used when an LED light source is being controlled using the current load control technique. In constant current reduction dimming, current is continuously provided to the LED light source, however, the DC magnitude of the current provided to the LED light source is varied to thus adjust the intensity of the light output. Examples of LED drivers are described in greater detail in commonly-assigned U.S. Pat. No. 8,492,987, issued Jul. 23, 2010, and U.S. Patent Application Publication No. 2013/0063047, published Mar. 14, 2013, both entitled LOAD CONTROL DEVICE FOR A LIGHT-EMITTING DIODE LIGHT SOURCE, the entire disclosures of which are hereby incorporated by reference.

SUMMARY

A load control device is described herein for controlling an amount of power delivered to an electrical load. The load control device may comprise a load regulation circuit, a load sense circuit and a control circuit. The load regulation circuit may be configured to control a magnitude of a load current conducted through the electrical load to control the amount of power delivered to the electrical load across a power range. The load regulation circuit may comprise a transformer and an output inductor located on a secondary side of the transformer. The load regulation circuit may further comprise a winding magnetically coupled to and electrically isolated from the output inductor. The load regulation circuit may be configured to generate a sense signal via the winding and the sense signal may be indicative of a voltage developed across the output inductor. The load sense circuit may be configured to generate, based on the sense signal, a load current feedback signal that indicates a magnitude of the load current conducted through the electrical load. The control circuit may be configured to generate, during at least a first portion of the power range, at least one drive signal based on the load current feedback signal. The at least one drive signal may be used to control the load regulation circuit to adjust an average magnitude of the load current conducted through the electrical load. The load current feedback signal may be generated using different techniques based on the operational characteristics of the electrical load. In one example technique, the sense signal may be integrated and filtered to derive the load current feedback signal. In another example technique, the sense signal may be used in conjunction with an input power of the load control device and an efficiency parameter of the load control device to derive the load current feedback signal. In yet another example technique, values derived from the foregoing two techniques may be blended together to obtain the load current feedback signal.

DETAILED DESCRIPTION

Figure 1:
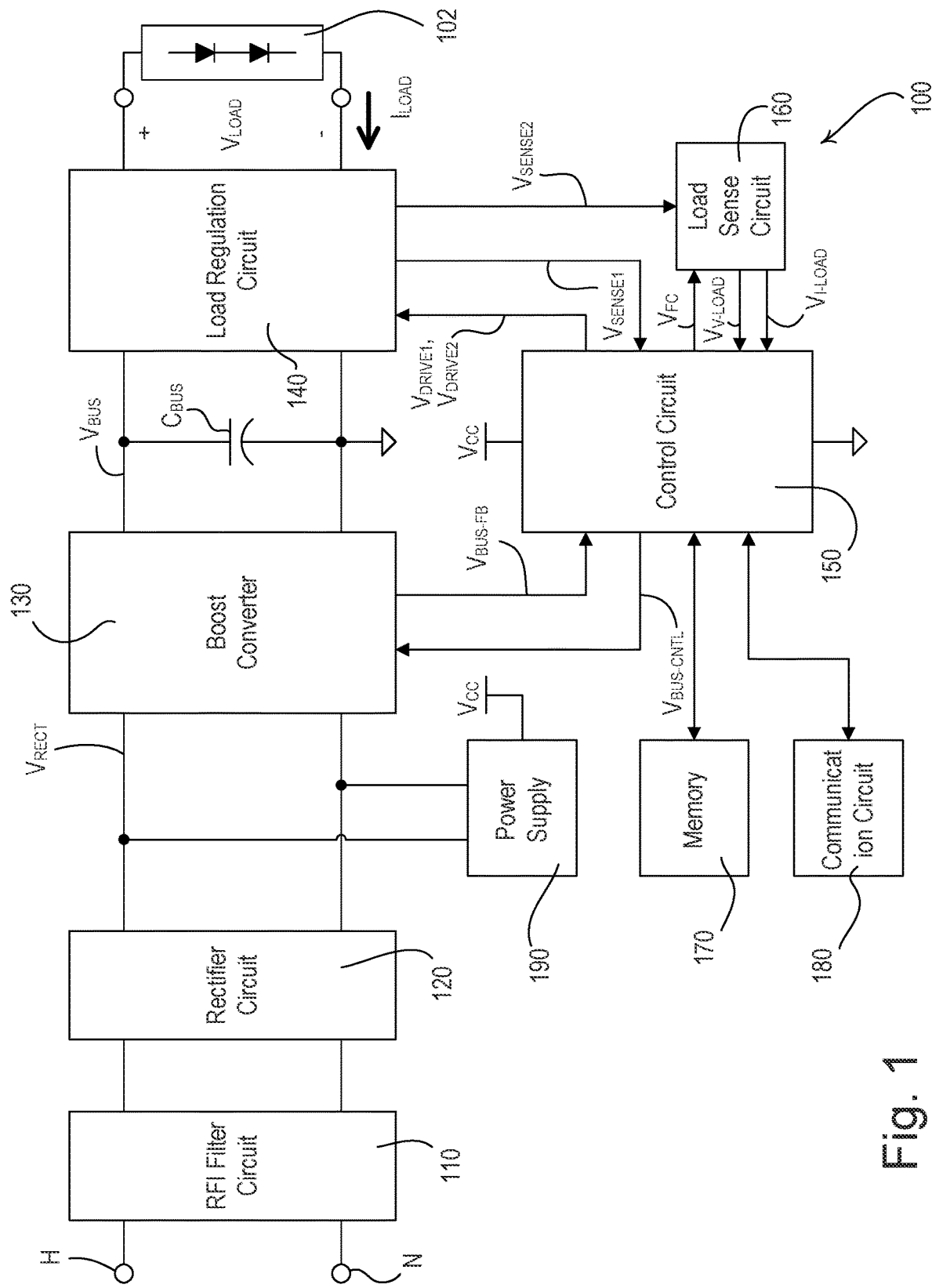
FIG. 1 is a simplified block diagram of an example load control device, such as, a light-emitting diode (LED) driver for controlling the intensity of an LED light source.

FIG. 1 is a simplified block diagram of an example load control device, e.g., a light-emitting diode (LED) driver 100, for controlling the amount of power delivered to an electrical load, such as, an LED light source 102 (e.g., an LED light engine), and thus the intensity of the light source. The LED light source 102 is shown as a plurality of LEDs connected in series but may comprise a single LED or a plurality of LEDs connected in parallel or a suitable combination thereof, depending on the particular lighting system. The LED light source 102 may comprise one or more organic light-emitting diodes (OLEDs). The LED driver 100 may comprise a hot terminal H and a neutral terminal that are adapted to be coupled to an alternating-current (AC) power source (not shown).

The LED driver 100 may comprise a radio-frequency interference (RFI) filter circuit 110, a rectifier circuit 120, a boost converter 130, a load regulation circuit 140, a control circuit 150, a current sense circuit 160, a memory 170, a communication circuit 180, and/or a power supply 190. The RFI filter circuit 110 may minimize the noise provided on the AC mains. The rectifier circuit 120 may generate a rectified voltage $V_{REC_T}$. The boost converter 130 may receive the rectified voltage $V_{RECT}$ and generate a boosted direct-current (DC) bus voltage $V_{BUS}$ across a bus capacitor $C_{BUS}$. The boost converter 130 may comprise any suitable power converter circuit for generating an appropriate bus voltage, such as, for example, a flyback converter, a single-ended primary-inductor converter (SEPIC), a Ćuk converter, or other suitable power converter circuit. The boost converter 120 may operate as a power factor correction (PFC) circuit to adjust the power factor of the LED driver 100 towards a power factor of one.

The load regulation circuit 140 may receive the bus voltage $V_{BUS}$ and control the amount of power delivered to the LED light source 102 across a power range. For example, the load regulation circuit may control the intensity of the LED light source 102 between a low-end (e.g., minimum) intensity $L_{LE}$ (e.g., approximately 0.1-5%) and a high-end (e.g., maximum) intensity $L_{HE}$ (e.g., approximately 100%). An example of the load regulation circuit 140 may be an isolated, half-bridge forward converter. An example of the load control device (e.g., LED driver 100) comprising a forward converter is described in greater detail in commonly-assigned U.S. Pat. No. 9,253,829, filed Feb. 2, 2016, entitled LOAD CONTROL DEVICE FOR A LIGHT-EMITTING DIODE LIGHT SOURCE, the entire disclosure of which is hereby incorporated by reference. The load regulation circuit 140 may also comprise, for example, a buck converter, a linear regulator, or any suitable LED drive circuit for adjusting the intensity of the LED light source 102.

The control circuit 150 may be configured to control the operation of the boost converter 130 and/or the load regulation circuit 140. An example of the control circuit 150 may be a controller. The control circuit 150 may comprise, for example, a digital controller or any other suitable processing device, such as, for example, a microcontroller, a programmable logic device (PLD), a microprocessor, an application specific integrated circuit (ASIC), or a field-programmable gate array (FPGA). The control circuit 150 may generate a bus voltage control signal $V_{BUS\text{-}CNTL}$, which may be provided to the boost converter 130 for adjusting the magnitude of the bus voltage $V_{BUS}$. The control circuit 150 may receive a bus voltage feedback signal $V_{BUS\text{-}FB}$ from the boost converter 130, which may indicate the magnitude of the bus voltage $V_{BUS}$.

The control circuit 150 may generate at least one drive signal such as drive signals $V_{DR1}$, $V_{DR2}$. The drive signals $V_{DR1}$, $V_{DR2}$ may be provided to the load regulation circuit 140 for adjusting the magnitude of a load voltage $V_{LOAD}$ generated across the LED light source 102 and/or the magnitude of a load current $I_{LOAD}$ conducted through the LED light source 120, for example, to control the intensity of the LED light source 120 to a target intensity $L_{TRGT}$, which may range from the low-end intensity $L_{LE}$ to the high-end intensity $L_{HE}$. The control circuit 150 may adjust an operating frequency fop and/or a duty cycle $DC_{INV}$ (e.g., an on time $T_{ON}$) of the drive signals $V_{DR1}$, $V_{DR2}$ to adjust the magnitude of the load voltage $V_{LOAD}$ and/or the load current $I_{LOAD}$. Near the high-end intensity $L_{HE}$, the load regulation circuit 140 may operate in a continuous mode of operation (e.g., as will be described in greater detail below). Near the low-end intensity $L_{LE}$, the load regulation circuit 140 may operate in a discontinuous mode of operation (e.g., as will be described in greater detail below).

The control circuit 150 may receive one or more sense signals from the load regulation circuit 140. For example, the load regulation circuit 140 may generate first and second sense signals $V_{SENSE1}$, $V_{SENSE2}$. The control circuit 150 may receive the first sense signal $V_{SENSE1}$ from the load regulation circuit 140 and may be configured to determine an input power $P_{IN}$ of the load regulation circuit 140 in response to the bus voltage feedback signal $V_{BUS\text{-}FB}$ and the first sense signal $V_{SENSE1}$. The LED driver 100 may also comprise a load sense circuit 160 that receives the second sense signal $V_{SENSE2}$ and generates a load voltage feedback signal $V_{V\text{-}LOAD}$ and/or a load current feedback signal $V_{I\text{-}LOAD}$. The load voltage feedback signal $V_{V\text{-}LOAD}$ may have a magnitude representative of a magnitude of the load voltage $V_{LOAD}$ while the load current feedback signal $V_{I\text{-}LOAD}$ may have a magnitude representative of an average magnitude $I_{AVE}$ of the load current $I_{LOAD}$. The control circuit 150 may generate a filter control signal $V_{FC}$ for controlling the load sense circuit 160 (e.g., for controlling a portion of the load sense circuit 160). For example, the control circuit 150 may use the filter control signal $V_{FC}$ to control the generation of the load current feedback signal $V_{I\text{-}LOAD}$. The control circuit 150 may be configured to receive the load voltage feedback signal $V_{V\text{-}LOAD}$ and/or the load current feedback signal $V_{I\text{-}LOAD}$.

The control circuit 150 may control the drive signals $V_{DR1}$, $V_{DR2}$ to adjust the magnitude of the load current $I_{LOAD}$ to a target load current $I_{TRGT}$ to thus control the amount of power delivered to the electrical load to a target power level (e.g., to control the intensity of the LED light source 102 to the target intensity $L_{TRGT}$) in response to the first sense signal $V_{SENSE1}$, the voltage feedback signal $V_{V\text{-}LOAD}$, and/or the load current feedback signal $V_{I\text{-}LOAD}$ (e.g., using a control loop). The control circuit may be configured to determine the average magnitude $I_{AVE}$ of the load current $I_{LOAD}$ using different techniques, for example, based on where the target power level falls within the power range of the lighting source 120 (e.g., based on where the target intensity $L_{TRGT}$ falls within the intensity range of the LED light source 120). When the target power level is greater than a first power threshold (e.g., when the target intensity $L_{TRGT}$ is greater than a first threshold intensity $L_{TH1}$ such as a high threshold intensity, which may be approximately 60%), the control circuit 150 may be configured to determine the average magnitude $I_{AVE}$ of the load current $I_{LOAD}$ using a first load current measurement technique. For example, when using the first load current measurement technique, the control circuit 150 may calculate the average magnitude $I_{AVE}$ of the load current $I_{LOAD}$ using the input power $P_{IN}$ of the load regulation circuit 140, the magnitude of the load voltage $V_{LOAD}$ (e.g., as determined from the load voltage feedback signal $V_{V-LOAD}$), and an efficiency η (e.g., a predetermined efficiency parameter) of the load regulation circuit 140. When the target power level is less than a second power threshold (e.g., when the target intensity $L_{TRGT}$ is less than a second threshold intensity $L_{TH2}$ such as a low threshold intensity, which may be approximately 40%), the control circuit 150 may be configured to determine the average magnitude $I_{AVE}$ of the load current $I_{LOAD}$ using a second load current measurement technique. For example, when using the second load current measurement technique, the control circuit 150 may determine the average magnitude $I_{AVE}$ of the load current $I_{LOAD}$ from the load current feedback signal $V_{I-LOAD}$.

When the target power level is less than or equal to the first power threshold and greater than or equal to the second power threshold (e.g., when the target intensity $L_{TRGT}$ is between the first threshold intensity $L_{TH1}$ and the second threshold intensity $L_{TH2}$), the control circuit 150 may be configured to use both of the first and second load current measurement techniques to determine the average magnitude $I_{AVE}$ of the load current $I_{LOAD}$. For example, the control circuit 150 may be configured to appropriately mix the average magnitude $I_{AVE}$ of the load current $I_{LOAD}$ determined using the first measurement technique and the average magnitude $I_{AVE}$ of the load current $I_{LOAD}$ determined using the second load current measurement technique to determine the average magnitude $I_{AVE}$ of the load current $I_{LOAD}$ (e.g., as will be described in greater detail below). The load regulation circuit 140 may transition between the continuous and discontinuous modes of operation at an intensity that is greater than the first threshold intensity $L_{TH1}$ to prevent the control circuit 150 from using the second load current measurement technique to determine the average magnitude $I_{AVE}$ of the load current $I_{LOAD}$ when the load regulation circuit is operating in the continuous mode.

The control circuit 150 may be coupled to the memory 170. The memory 170 may store operational characteristics of the LED driver 100 (e.g., the target intensity $L_{TRGT}$, the low-end intensity $L_{LE}$, the high-end intensity $L_{HE}$, etc.). The communication circuit 180 may be coupled to, for example, a wired communication link or a wireless communication link, such as a radio-frequency (RF) communication link or an infrared (IR) communication link. The control circuit 150 may be configured to update the target intensity $L_{TRGT}$ of the LED light source 102 and/or the operational characteristics stored in the memory 170 in response to messages (e.g., digital messages) received via the communication circuit 180. The LED driver 100 may be configured to receive a phase-control signal from a dimmer switch for determining the target intensity $L_{TRGT}$ for the LED light source 102. The power supply 190 may receive the rectified voltage $V_{RECT}$ and generate a direct-current (DC) supply voltage $V_{CC}$ for powering the circuitry of the LED driver 100.

Figure 2:
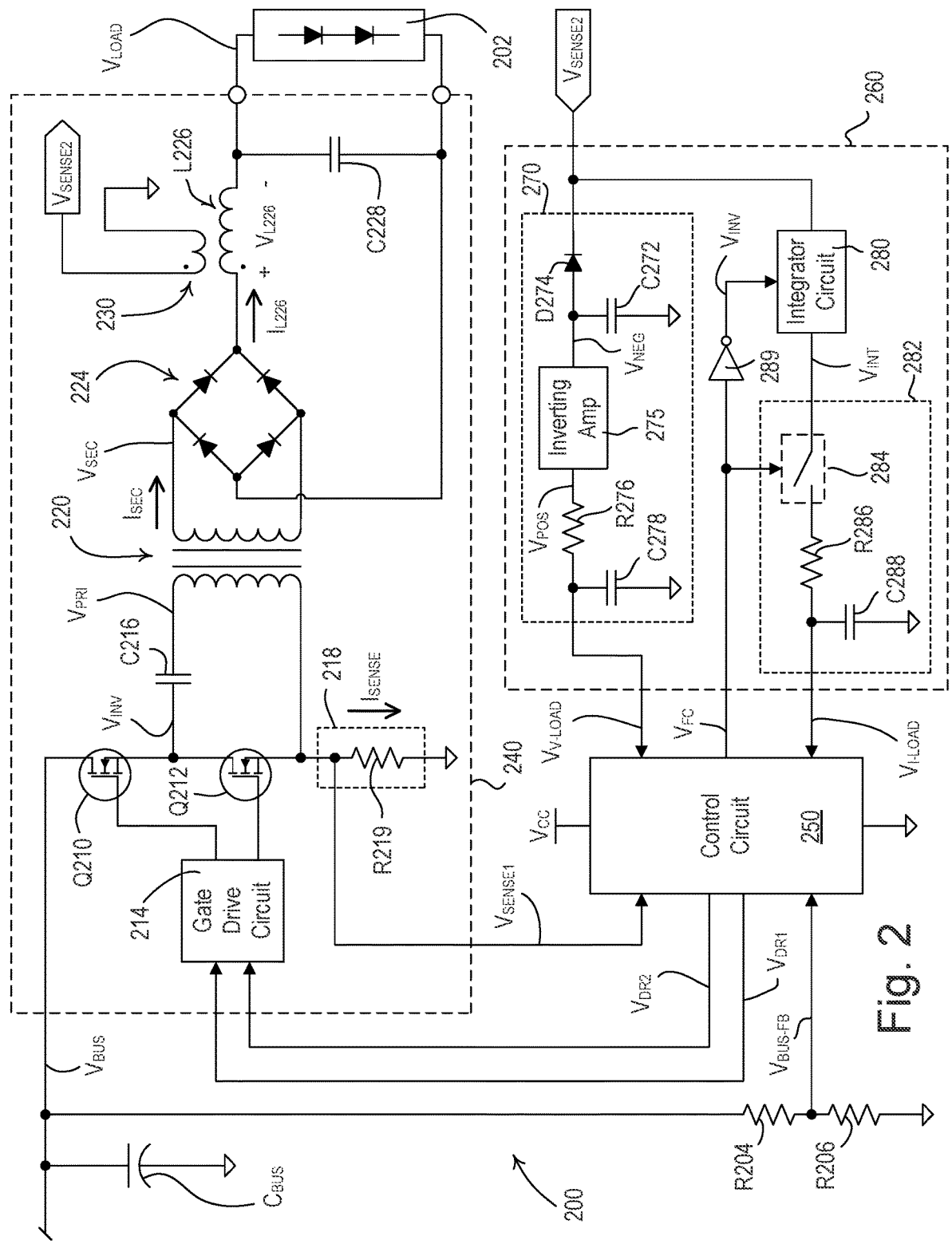
FIG. 2 is a simplified schematic diagram of a forward converter and a load sense circuit of an example LED driver.

FIG. 2 is a simplified schematic diagram of a forward converter 240 (e.g., the load regulation circuit 140) and a load sense circuit 260 (e.g., the current sense circuit 160) of an example LED driver 200 (e.g., the LED driver 100 shown in FIG. 1). The LED driver 200 may also comprise a control circuit 250 for controlling the forward converter 240 to adjust a present intensity $L_{PRES}$ of an LED light source 202 in response to the load sense circuit 260. The control circuit 250 may receive a bus voltage feedback signal $V_{BUS-FB}$ that may indicate a magnitude of a bus voltage $V_{BUS}$ received by the forward converter 240. For example, the bus voltage feedback signal $V_{BUS-FB}$ may be generated by a resistive divider including resistors R204, R206.

As shown in FIG. 2, the forward converter 240 may comprise a half-bridge inverter circuit including two field effect transistors (FETs) Q210, Q212 for generating a high-frequency inverter voltage $V_{IN}v$ from the bus voltage $V_{BUS}$. The control circuit 250 may generate at least one drive signal (e.g., drive signals $V_{DR1}$, $V_{DR2}$) for rendering the FETs Q210, Q212 conductive and non-conductive. The drive signals $V_{DR1}$, $V_{DR2}$ may be coupled to gates of the respective FETs Q210, Q212 via a gate drive circuit 214 (e.g., which may comprise part number L6382DTR, manufactured by ST Microelectronics). The forward converter 240 may comprise a transformer 220 and the inverter voltage $V_{IN}v$ may be coupled to the primary winding of the transformer 220 through a DC-blocking capacitor C216 (e.g., which may have a capacitance of approximately 0.047 g), such that a primary voltage $V_{PRI}$ may be generated across the primary winding.

The forward converter 240 may comprise a current sense circuit 218 (e.g., including a sense resistor R219) coupled in series with the half-bridge inverter (e.g., in series with the first FET Q210 and the second FET Q212). The current sense circuit 218 may generate a first sense signal $V_{SENSE1}$ in response to a sense current $I_{SENSE}$ conducted through the sense resistor R219 (e.g., conducted through the half-bridge inverter). The control circuit 250 may receive the first sense signal $V_{SENSE1}$ and may be configured to determine the magnitude of the sense current $I_{SENSE}$ of the forward converter 240 in response to the first sense signal $V_{SENSE1}$. The control circuit 250 may use the magnitude of the sense current $I_{SENSE}$ to determine an input power $P_{IN}$ of the forward converter 240. For example, the control circuit 250 may use the magnitude of the bus voltage $V_{BUS}$ (e.g., which may be determined from the bus voltage feedback signal $V_{BUS-FB}$ and/or stored in the memory 170) to calculate the input power $P_{IN}$, e.g., $P_{IN}=V_{BUS} \cdot I_{SENSE}$.

The secondary winding of the transformer 220 may generate a secondary voltage $V_{SEC}$ and may be coupled to the AC terminals of a rectifier bridge 224 (e.g., a full-wave diode rectifier bridge) for rectifying the secondary voltage generated across the secondary winding. The positive DC terminal of the rectifier bridge 224 may be coupled to the LED light source 202 through an output inductor L226 (e.g., an energy storage inductor, which may be located on the secondary side of the transformer and may have an inductance of approximately 400 pH), such that an inductor current $I_{L226}$ may be conducted through the output inductor L226 and a load voltage $V_{LOAD}$ may be generated across an output capacitor C228 (e.g., which may have a capacitance of approximately 3 µF). The transformer 220 may provide electrical isolation between the line voltage input of the LED driver 200 (e.g., the hot terminal and the neutral terminal N) and the LED light source 202.

The control circuit 250 may be configured to pulse-width modulate (PWM) the drive signals $V_{DR1}$, $V_{DR2}$ to control the present intensity $L_{PRES}$ of the LED light source 202 towards a target intensity $L_{TRGT}$, which may range from the low-end intensity $L_{LE}$ to the high intensity $L_{HE}$. The control circuit 250 may be configured to adjust respective duty cycles $DC_1$, $DC_2$ of the drive signals $V_{DR1}$, $V_{DR2}$ to adjust the present intensity $L_{PRES}$. Near the high-end intensity $L_{HE}$, the load regulation circuit 240 may operate in a continuous mode of operation. The continuous mode of operation may refer to a mode in which the inductor current $I_{L226}$ may be continuous (e.g., the inductor current $I_{L226}$ may be continuously above zero amps). Near the low-end intensity $L_{LE}$, the load regulation circuit 140 may operate in a discontinuous mode of operation. The discontinuous mode of operation may refer to a mode in which the inductor current $I_{L226}$ may be discontinuous (e.g., the inductor current $I_{L226}$ may reach approximately zero amps during at least a portion of an operating period of the drive signals $V_{DR1}$, $V_{DR2}$).

The control circuit 250 may receive a load-voltage feedback signal $V_{V-LOAD}$ and/or a load-current feedback signal $V_{I-LOAD}$ from the load sense circuit 260. The load sense circuit 260 may generate the load-voltage feedback signal $V_{V-LOAD}$ and/or load-current feedback signal $V_{I-LOAD}$ in response to a second sense signal $V_{SENSE2}$ received from the load regulation circuit 240. For example, the second sense signal $V_{SENSE2}$ may be generated across a winding 230 magnetically coupled to the output inductor L226 of the load regulation circuit 140 and may be representative of the magnitude of an inductor voltage $V_{L226}$ generated across the output inductor. The winding 230 may be electrically isolated from the output inductor L226, and as such the load sense circuit 260 (and thus the line voltage input of the LED driver 200) may be electrically isolated from the load regulation circuit 240 (and thus the LED light source 202).

When the target intensity $L_{TRGT}$ of the LED light source 202 is greater than a first threshold intensity $L_{TH1}$ (e.g., approximately 60% of a maximum intensity of the lighting load), the control circuit 250 may be configured to determine the average magnitude $I_{AVE}$ of the load current $I_{LOAD}$ from the load-voltage feedback signal $V_{V-LOAD}$ using a first load current measurement technique. The load sense circuit 260 may comprise a peak detect circuit 270 for generating the load-voltage feedback signal $V_{V-LOAD}$ from the second sense signal $V_{SENSE2}$. When the FETs Q210, Q212 of the load regulation circuit 240 are non-conductive, the output inductor L226 is electrically coupled in parallel with the LED light source 202, and the magnitude of the inductor voltage $V_{L226}$ may be approximately equal to the load voltage $V_{LOAD}$. When the FETs Q210, Q212 of the load regulation circuit 240 are non-conductive (e.g., when the magnitude of the inductor voltage $V_{L226}$ may be approximately equal to the load voltage $V_{LOAD}$), a capacitor C272 may be configured to charge through a diode D274 and the winding 230 to the peak magnitude of the second sense signal $V_{SENSE2}$. Because of the orientation of the diode D274, a negative voltage $V_{NEG}$ (e.g., voltage having a negative polarity) may be generated at the junction of the capacitor C272 and the diode D274. The negative voltage $V_{NEG}$ may be received by an inverting amplifier 275 (e.g., an operational amp inverter), which may generate a positive voltage $V_{POS}$ (e.g., a voltage having positive polarity). The positive voltage $V_{POS}$ may be filtered by a resistor-capacitor (RC) filter circuit comprising a resistor R276 (e.g., having a resistance of approximately 12.1 kΩ) and a capacitor C278 (e.g., having a capacitance of approximately 1000 pF). The load-voltage feedback signal $V_{V-LOAD}$ may be generated at the junction of the resistor R276 and the capacitor C278 and may have a magnitude (e.g., a DC magnitude) that is representative of the magnitude of the load voltage $V_{LOAD}$. The control circuit 250 may calculate the average magnitude $I_{AVE}$ of the load current $I_{LOAD}$ using the input power $P_{IN}$ of the forward converter 240 (e.g., determined from the magnitude of the bus voltage $V_{BUS}$ and the first sense signal $V_{SENSE1}$), the magnitude of the load voltage $V_{LOAD}$ determined from the load-voltage feedback signal $V_{V-LOAD}$, and an efficiency η of the forward converter 240, e.g., $I_{AVE} = (\eta \cdot P_{IN})/V_{LOAD}$, where $\eta \cdot P_{IN}$ may represent the output power $P_{OUT}$ of the load control device.

When the target intensity $L_{TRGT}$ of the LED light source 202 is less than a second threshold intensity $L_{TH2}$ (e.g., approximately 40% of the maximum intensity of the lighting load), the control circuit 250 may be configured to determine the average magnitude $I_{AVE}$ of the load current $I_{LOAD}$ from the load-current feedback signal $V_{I-LOAD}$ using a second load current measurement technique. The load sense circuit 260 may comprise an integrator circuit 280 and a filter circuit 282 (e.g., such as a boxcar filter circuit) for generating the load-current feedback signal $V_{I-LOAD}$. The integrator circuit 280 may integrate the second sense signal $V_{SENSE2}$ and may generate an integrated signal $V_{INT}$, which may be approximately equal to or may be a scaled version of (e.g., a percentage of) the inductor current $I_{L226}$. For example, the integrator circuit 280 may comprise an operational amplifier integrator. Since the magnitude of the inductor voltage $V_{L226}$ may be a function of the derivative of the inductor current $I_{L226}$, the integral of the second sense signal $V_{SENSE2}$ may be approximately equal to or may be a scaled version of (e.g., a percentage of) the inductor current $I_{L226}$, where the scaling factor may be dependent upon a number of factors including the inductance of the output inductor L226, the number of turns of the winding 230, and/or the values of the components of the integrator circuit 280.

The average magnitude $I_{AVE}$ of the load current $I_{LOAD}$ may be approximately equal to the average magnitude $I_{AVE}$ of the inductor current $I_{L226}$. The filter circuit 282 may be configured to filter the integrated signal $V_{INT}$ to generate the load-current feedback signal $V_{I-LOAD}$, which may have a DC magnitude that is representative of the average magnitude $I_{AVE}$ of the load current $I_{LOAD}$. The filter circuit 282 may operate to improve the performance of the load control device in various ways. For example, when the forward converter 240 is operating in the discontinuous mode (e.g., near the low-end intensity $L_{LE}$), the load current $I_{LOAD}$ and/or the inductor current $I_{L226}$ may reach approximately zero amps during at least a portion of the operating periods of the drive signals $V_{DR1}$, $V_{DR2}$ (e.g., the inductor current $I_{L226}$ and/or the load current $I_{LOAD}$ may comprise one or more pulses in the discontinuous mode). The pulses of the load current $I_{LOAD}$ (e.g., and thus pulses of the inductor current $I_{L226}$) may be far apart and the average magnitude $I_{AVE}$ of the integrated signal $V_{INT}$ may be so small that the control circuit 250 may not able to appropriately sample and/or measure the average magnitude $I_{AVE}$ of the integrated signal $V_{INT}$. The filter circuit 282 may be configured to filter (e.g., only filter) the integrated signal $V_{INT}$ during a filter window time period $T_{FW}$ (e.g., a time window) around the pulses of the inductor current $I_{L226}$. The filter circuit 282 may comprise a controllable switching device (e.g., a controllable switch 284) that may be rendered conductive and non-conductive in response to a filter control signal $V_{FC}$ generated by the control circuit 250. This way, the control circuit 250 may control the controllable switch 284 to selectively couple the integrated signal $V_{INT}$ to a filter (e.g., an RC filter) comprising a resistor R286 (e.g., having a resistance of approximately 510Ω) and a capacitor C288 (e.g., having a capacitance of approximately 0.47 µF). The load-current feedback signal $V_{I\text{-}LOAD}$ may be generated at the junction of the resistor R286 and the capacitor C288.

Since the control circuit 250 is generating the drive signals $V_{DR1}$, $V_{DR2}$, which cause the generation of the pulses of the inductor current $I_{L226}$, the control circuit 250 may generate the filter control signal $V_{FC}$ to render the controllable switch 284 conductive and non-conductive in coordination with the drive signals $V_{DR1}$, $V_{DR2}$. For example, the control circuit 250 may drive the filter control signal $V_{FC}$ high (e.g., towards the supply voltage $V_{CC}$) to render the controllable switch 284 conductive at approximately the same time as driving either of the drive signals $V_{DR1}$, $V_{DR2}$ high. The control circuit 250 may maintain the filter control signal $V_{FC}$ high for filter window time period $T_{FW}$, which may be at least as long as the length of each pulse of the inductor current $I_{L226}$ (e.g., at least as long as the length of each pulse of the load current $I_{LOAD}$). At the end of the filter window time period $T_{FW}$, the control circuit 250 may drive the filter control signal $V_{FC}$ low (e.g., towards zero volts) to render the controllable switch 284 non-conductive. The capacitor C288 may charge when the controllable switch 284 is conductive and may maintain the magnitude of the load-current feedback signal $V_{I\text{-}LOAD}$ substantially constant when the controllable switch 284 is non-conductive. As a result, the magnitude of the load-current feedback signal $V_{I\text{-}LOAD}$ may indicate an average magnitude $I_{WIN}$ of the load current $I_{LOAD}$ during (e.g., only during) the filter window when the filter control signal $V_{FC}$ is high. The control circuit 250 may be configured to calculate the average magnitude $I_{AVE}$ of the load current $I_{LOAD}$ based on the average magnitude $I_{WIN}$ of the load current $I_{LOAD}$ during the filter window and a present duty cycle $DC_{SW}$ of the filter control signal $V_{FC}$, e.g., $I_{AVE} = DC_{SW} \cdot I_{WIN}$.

The filter control signal $V_{FC}$ may be used to reset the integrator circuit 280 at the end of the filter window when the magnitude of the filter control signal $V_{FC}$ is high. For example, the filter control signal $V_{FC}$ may be coupled to the integrator circuit 280 via an inverter circuit 289, which may be configured to generate an inverted signal $V_{INV}$. When the filter control signal $V_{FC}$ is driven low (e.g., towards circuit common) at the end of the filter window, the inverted signal $V_{INV}$ may be driven high to reset the inverter circuit 280.

When the target intensity $L_{TRGT}$ of the LED light source 2020 is less than or equal to the first threshold intensity $L_{TH1}$ and greater than or equal to the second threshold intensity $L_{TH2}$, the control circuit 250 may be configured to use both of the load-voltage feedback signal $V_{V\text{-}LOAD}$ and the load-current feedback signal $V_{I\text{-}LOAD}$ to determine the average magnitude of the load current $I_{LOAD}$. For example, the control circuit 150 may be configured to appropriately mix the average magnitude of the load current $I_{LOAD}$ determined from the load-voltage feedback signal $V_{V\text{-}LOAD}$, and the average magnitude of the load current $I_{LOAD}$ determined from the load-current feedback signal $V_{I\text{-}LOAD}$ (e.g., as will be described in greater detail below) to derive an estimated average magnitude of the load current $I_{LOAD}$.

Figure 3:
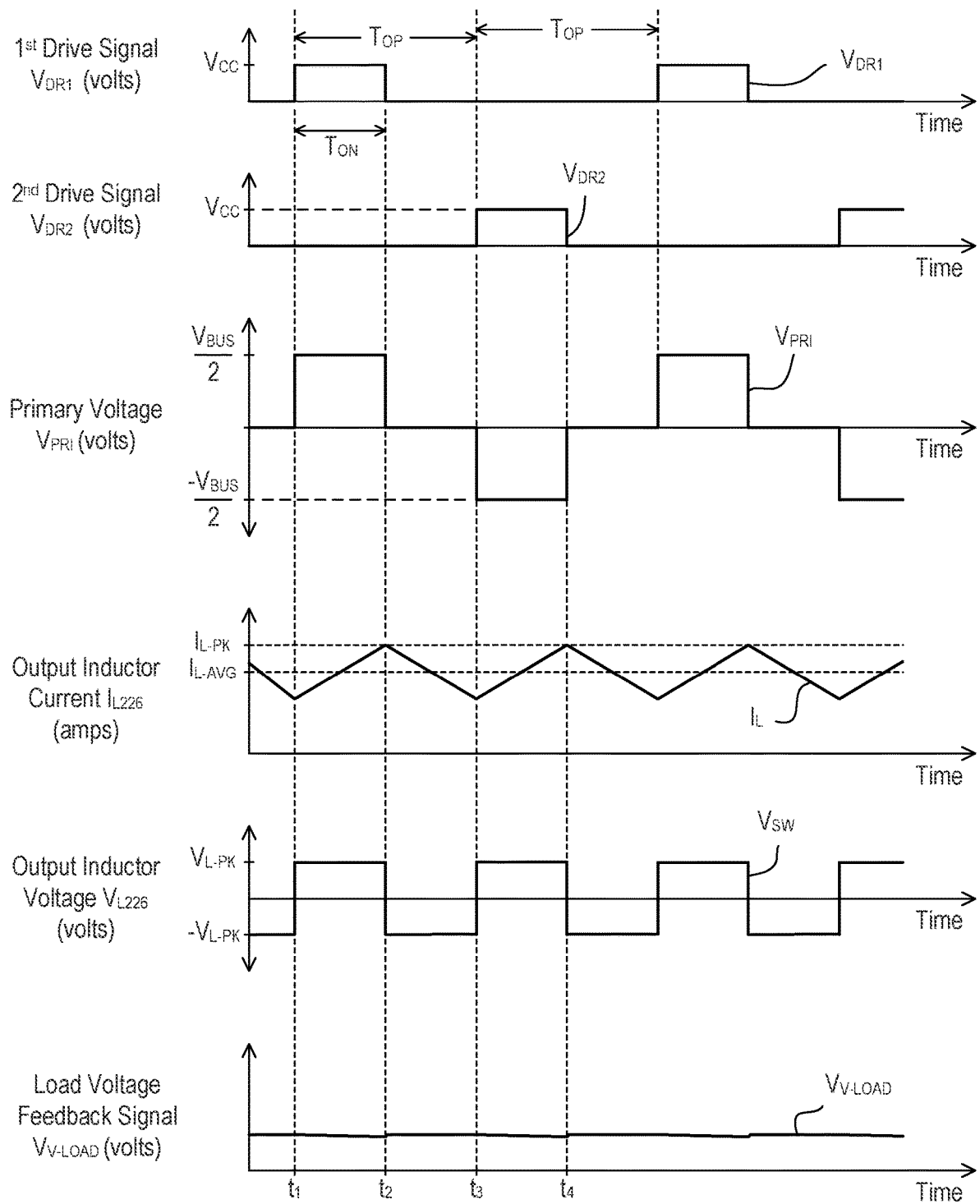
FIG. 3 is a diagram of simplified waveforms illustrating the operation of the LED driver of FIG. 2 when the forward converter is operating in a continuous mode of operation (e.g., near a high-end intensity).

FIG. 3 is a diagram of simplified waveforms illustrating the operation of the LED driver 200 when the forward converter 240 is operating in the continuous mode of operation (e.g., near the high-end intensity $L_{HE}$). The drive signals $V_{DR1}$, $V_{DR2}$ may be characterized by an operating frequency fop and an operating period $T_{OP}$. During each period of the drive signals $V_{DR1}$, $V_{DR2}$, the control circuit 250 may drive one of the drive signals $V_{DR1}$, $V_{DR2}$ high (e.g., towards the supply voltage $V_{CC}$) for an on-time $T_{ON}$ (e.g., between times $t_1$ and $t_2$ in FIG. 3) to render the respective FET Q210, Q212 conductive for the on-time at different times (e.g., the FETs Q210, Q212 are conductive at different times). The control circuit 250 may then drive signal $V_{DR1}$, $V_{DR2}$ low for the remainder of the period (e.g., between times $t_2$ and $t_3$ in FIG. 3). During the next period of the drive signals $V_{DR1}$, $V_{DR2}$, the control circuit 250 may drive the other one of the drive signals $V_{DR1}$, $V_{DR2}$ high for the on-time $T_{ON}$ (e.g., between times $t_3$ and $t_4$ in FIG. 3) to render the respective FET Q210, Q212 conductive for the on-time.

When the high-side FET Q210 is conductive, the bus voltage $V_{BUS}$ may be coupled across the series combination of the capacitor C216 and the primary winding of the transformer 220 allowing the capacitor C216 to charge, such that the primary voltage $V_{PRI}$ has a magnitude of approximately half of the magnitude of the bus voltage $V_{BUS}$. Accordingly, the magnitude of the primary voltage $V_{PRI}$ across the primary winding of the transformer 220 may be equal to approximately half of the magnitude of the bus voltage $V_{BUS}$ (e.g., $V_{BUS}/2$). When the low-side FET Q212 is conductive, the capacitor C216 may be coupled across the primary winding, such that the primary voltage $V_{PRI}$ may have a negative polarity with a magnitude equal to approximately half of the magnitude of the bus voltage $V_{BUS}$.

When either of the high-side and low-side FETs Q210, Q212 are conductive, a secondary voltage $V_{SEC}$ may be developed across the secondary winding of the transformer 220. Because the secondary winding of the transformer 220 is coupled to the output inductor L226 and the LED light source 202 through the rectifier bridge 224, the secondary voltage $V_{SEC}$ may be produced across the series combination of the output inductor L226 and the LED light source 202 when either of the FETs Q210, Q212 are conductive. At this time, the magnitude of the inductor voltage $V_{L226}$ may be at a peak magnitude $V_{L\text{-}PK}$ and the magnitude of the output inductor current $I_{L226}$ conducted by the output inductor L226 may increase with respect to time as shown in FIG. 3. When the FETs Q210, Q212 are non-conductive, the output inductor L226 may be coupled in parallel with the LED light source 202 and the magnitude of the inductor voltage $V_{L226}$ may have a negative peak magnitude $-V_{L\text{-}PL}$. In addition, the magnitude of the inductor current $I_{L226}$ may decrease in magnitude with respect to time when the FETs Q210, Q212 are non-conductive. Since the forward converter 240 is operating in the continuous mode, the magnitude of the inductor current $I_{L226}$ does not reach zero amps (e.g., the magnitude of the inductor current $I_{L226}$ is continuously above zero amps during respective operating periods of the drive control signals $V_{DR1}$, $V_{DR2}$). In the continuous mode, the operating period $T_{OP}$ of the drive signals $V_{DR}$ may be equal to a minimum operating period $T_{MIN}$. The inductor current $I_{L226}$ may be characterized by a peak magnitude $I_{L\text{-}PK}$ and an average magnitude $I_{L\text{-}AVG}$. The control circuit 250 may increase and/or decrease the on-time $T_{ON}$ of the drive control signals $V_{DR1}$, $V_{DR2}$ (e.g., and the duty cycle $DC_{INV}$ of the inverter voltage $V_{INV}$) to respectively increase and decrease the average magnitude $I_{L\text{-}AVG}$ of the output inductor current $I_L$, and thus respectively increase and decrease the intensity of the LED light source 202.

Near the high-end intensity Lap (e.g., when the forward converter 240 is operating in the continuous mode of operation), the control circuit 250 may determine the average magnitude of the load current $I_{LOAD}$ from the load-voltage feedback signal $V_{V\text{-}LOAD}$ using the first load current measurement technique. When the FETs Q210, Q212 are rendered non-conductive (e.g., at times $t_2$ and $t_4$ in FIG. 3), the capacitor C272 of the peak detect circuit 270 may charge to the peak magnitude of the second sense signal $V_{SENSE2}$ for generating the load-voltage feedback signal $V_{V\text{-}LOAD}$ across the capacitor C278. When either of the FETs Q210, Q212 are conductive, the capacitor C278 may maintain the magnitude of the load-voltage feedback signal $V_{V\text{-}LOAD}$ substantially constant (e.g., between times $t_3$ and $t_4$). The control circuit 250 may sample (e.g., periodically sample) the magnitude of the load-voltage feedback signal $V_{V\text{-}LOAD}$ and calculate the average magnitude of the load current $I_{LOAD}$.

Figure 4:
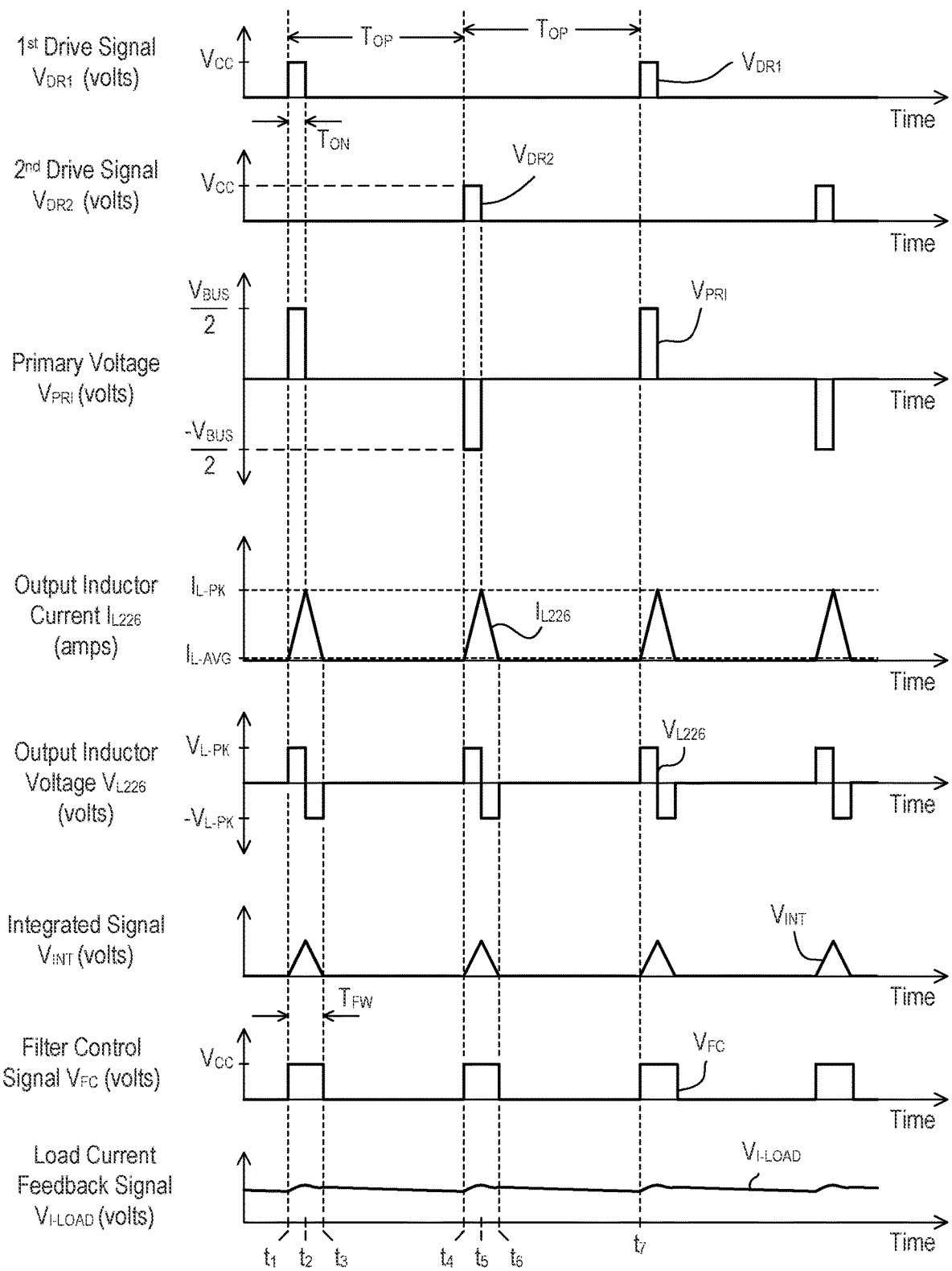
FIG. 4 is a diagram of simplified waveforms illustrating the operation of the LED driver of FIG. 2 when the forward converter is operating in a discontinuous mode of operation (e.g., near a low-end intensity).

FIG. 4 is a diagram of simplified waveforms illustrating the operation of the LED driver 200 when the forward converter 240 is operating in the discontinuous mode of operation (e.g., near the low-end intensity $L_{LE}$). The control circuit 250 may generate the drive signals $V_{DR1}$, $V_{DR2}$ with the operating period $T_{OP}$ (e.g., the same operating period as in FIG. 3), but with a smaller length for the on-time $T_{ON}$ (e.g., compared to the on-time in FIG. 3).

When either of the high-side and low-side FETs Q210, Q212 are conductive, the magnitude of the inductor voltage $V_{L226}$ may be at the peak magnitude $V_{L\text{-}PK}$ and the magnitude of the output inductor current $I_{L226}$ conducted by the output inductor L226 may increase with respect to time (e.g., between times $t_1$ and $t_2$ and/or between times $t_4$ and $t_5$). When the FETs Q210, Q212 are non-conductive, the magnitude of the inductor voltage $V_{L226}$ may be at the negative peak magnitude $-V_{L\text{-}PK}$, and the magnitude of the inductor current $I_{L226}$ may decrease in magnitude with respective to time until the magnitude of the inductor current $I_{L226}$ reaches approximately zero amps (e.g., between times $t_2$ and $t_3$ and/or between times $t_5$ and $t_6$). Since the forward converter 240 is operating in the discontinuous mode, the magnitude of the inductor current $I_{L226}$ may be at approximately zero amps for the remainder of the present operating period $T_{OP}$ (e.g., between times $t_3$ and $t_4$ and/or between $t_6$ and $t_7$). At the beginning of each period, the output inductor L226 may conduct a pulse of current (e.g., a triangular pulse), as shown in FIG. 4. Because the pulses of current may be spaced apart by larger amounts as the present intensity $L_{PRES}$ is decreased towards the low-end intensity $L_{LE}$, the average magnitude $I_{L\text{-}AVG}$ of the inductor current $I_{L226}$ may become very small (e.g., much smaller than the peak magnitude Um of the inductor current $I_{L226}$).

Near the low-end intensity $L_{LE}$ (e.g., when the forward converter 240 is operating in the discontinuous mode of operation), the control circuit 250 may determine the average magnitude of the load current $I_{LOAD}$ (e.g., from the load-current feedback signal $V_{I\text{-}LOAD}$) using the second load current measurement technique. The integrator circuit 280 of the load sense circuit 260 may integrate the second sense signal $V_{SENSE2}$ to generate the integrated signal $V_{INT}$, which may be equal to or may be a scaled version of the inductor current $I_{L226}$ as shown in FIG. 4. Since the average magnitude $I_{L\text{-}AVG}$ of the inductor current $I_{L226}$ may be very small (e.g., close to approximately zero amps) near the low-end intensity $L_{LE}$, the control circuit 250 may be configured to generate the filter control signal $V_{FC}$ to enable the filter circuit 282 to filter (e.g., only filter) the integrated signal $V_{INT}$ during filter window time periods $T_{FW}$ around the pulses of the inductor current $I_{L226}$. The control circuit 250 may generate the filter control signal $V_{FC}$ in coordination with the drive signals $V_{DR1}$, $V_{DR2}$. For example, the control circuit 250 may generate the filter control signal $V_{FC}$ as a pulse-width modulated signal having a period equal to or similar as the operating period $T_{OP}$ of the drive signals $V_{DR1}$, $V_{DR2}$. The control circuit 250 may drive the magnitude of the filter control signal $V_{FC}$ high at approximately the same time or slightly before the time at which either of the drive signals $V_{DR1}$, $V_{DR2}$ is driven high (e.g., at times $t_1$ and $t_4$ in FIG. 4). For example, the filter window time periods $T_{FW}$ of the filter control signal $V_{FC}$ may each be approximately equal to twice the on-time $T_{ON}$ of the drive signals $V_{DR1}$, $V_{DR2}$. In addition, the filter window time periods $T_{FW}$ of the filter control signal $V_{FC}$ may each be longer than twice the on-time $T_{ON}$ of the drive signals $V_{DR1}$, $V_{DR2}$, for example, up to approximately the minimum operating period $T_{MIN}$ of the drive signals. The control circuit 250 may drive the magnitude of the filter control signal $V_{FC}$ low at the ends of the filter window time periods $T_{FW}$ (e.g., at times $t_3$ and $t_6$ in FIG. 4). When the filter control signal $V_{FC}$ is high, the filter circuit 282 may be configured to filter the integrated signal $V_{INT}$ to generate the load-current feedback signal $V_{I\text{-}LOAD}$. When the filter control signal $V_{FC}$ is low (e.g., between times $t_3$ and $t_4$), the capacitor C288 of the filter circuit 280 may maintain the magnitude of the load-current feedback signal $V_{I\text{-}LOAD}$ substantially constant (e.g., the magnitude of the load-current feedback signal $V_{I\text{-}LOAD}$ between times $t_3$ and $t_4$ may be substantially similar to the magnitude of the load-current feedback signal $V_{I\text{-}LOAD}$ between times $t_1$ and $t_2$). The control circuit 250 may sample (e.g., periodically sample) the magnitude of the load-current feedback signal $V_{I\text{-}LOAD}$ to determine the average magnitude of the load current $I_{LOAD}$.

Figure 5:
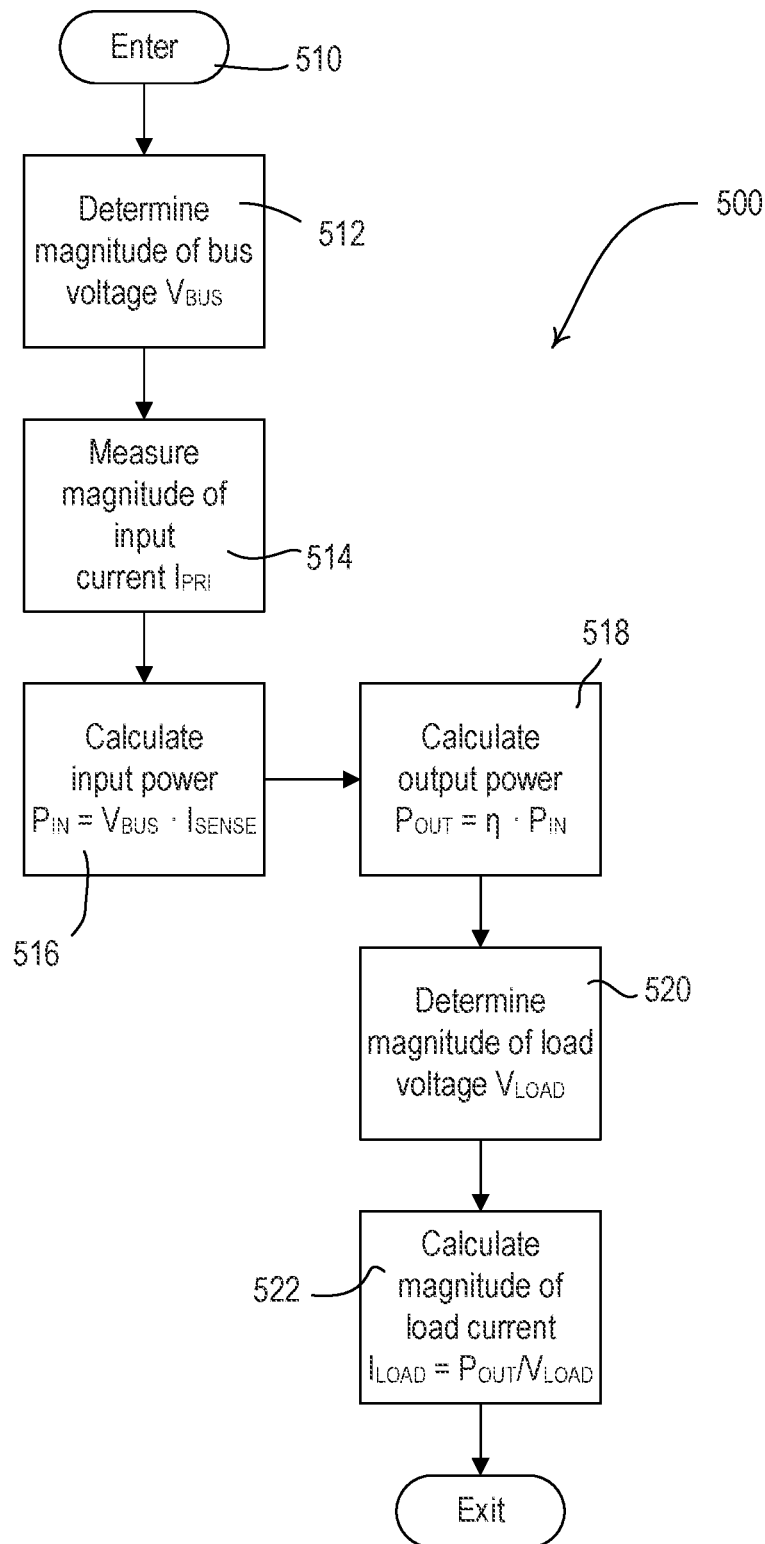
FIGS. 5-7 are simplified example flowcharts of load current measurement procedures that each may be executed by a control circuit of a load control device for determining a magnitude of a load current conducted through an electrical load.

FIG. 5 is a simplified example flowchart of a first load current measurement procedure 500 that may be executed by a control circuit of a load control device (e.g., the control circuit 150 of the LED driver 100 and/or the control circuit 250 of the LED driver 200) for controlling an electrical load (e.g., an LED light source, such as the LED light source 202). For example, the control circuit 250 may execute the first load current measurement procedure 500 to determine an average magnitude of a load current conducted through the electrical load (e.g., the load current $I_{LOAD}$ described herein) using a first load current measurement technique. The load control device may comprise a load regulation circuit (e.g., the load regulation circuit 140 and/or the forward converter 240), which may in turn comprise an output inductor. The output inductor may be magnetically coupled to a winding for generating a sense voltage that may be used to generate a load-voltage feedback signal. The load-voltage feedback signal may have a magnitude representative of the magnitude of a load voltage generated across the electrical load (e.g., the load-voltage feedback signal $V_{V\text{-}LOAD}$).

The control circuit may execute the first load current measurement procedure 500, for example, periodically at 510 (e.g., when a target power level of the electrical load is above a high threshold). In addition, the first load current measurement procedure 500 may be executed as part of another load current measurement procedure. At 512, the control circuit may determine the magnitude of the bus voltage $V_{BUS}$. For example, the control circuit 250 may determine the magnitude of the bus voltage $V_{BUS}$ from the bus voltage feedback signal $V_{BUS\text{-}FB}$ at 512. In addition, the control circuit 250 may recall a target bus voltage (e.g., for controlling the bus voltage control signal $V_{BUS\text{-}CNTL}$) from memory at 512 to use as the magnitude of the bus voltage $V_{BUS}$. At 514, the control circuit may determine the magnitude of the sense current $I_{SENSE}$ (e.g., shown in FIG. 2). For example, the control circuit 250 may determine the magnitude of the sense current $I_{SENSE}$ at 514 from the first sense signal $V_{SENSE1}$ generated by the current sense circuit 218 when the second FET Q212 is conductive. At 516, the control circuit may calculate the input power $P_{IN}$ of the load control device using the determined magnitude of the bus voltage $V_{BUS}$ and the determined magnitude of the sense current $I_{SENSE}$, e.g., $P_{IN}=V_{BUS} \cdot I_{SENSE}$.

At 518, the control circuit may calculate the output power $P_{OUT}$ of the load control device using the calculated input power $P_{IN}$ and an efficiency η of the power regulation circuit. For example, the efficiency η may be a predetermined value stored in memory (e.g., the memory 170). At 520, the control circuit may determine the magnitude of the load voltage $V_{LOAD}$, e.g., by sampling and processing (e.g., scaling) the load-voltage feedback signal $V_{V-LOAD}$. At 522, the control circuit may calculate the magnitude of the load current $I_{LOAD}$ using the calculated output power $P_{OUT}$ and the determined load voltage $V_{LOAD}$, e.g., $I_{LOAD}=P_{OUT}/V_{LOAD}$, before the first load current measurement procedure 500 exits.

Figure 6:
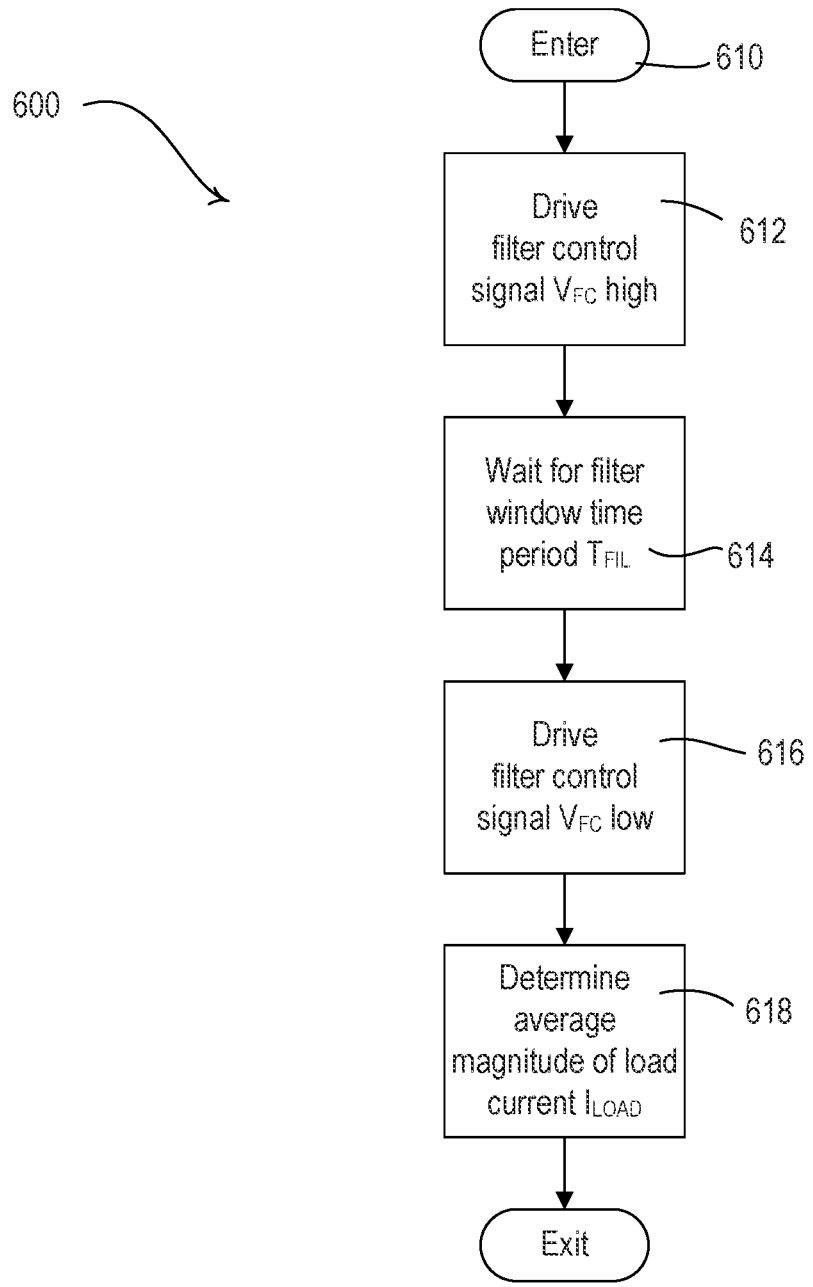

FIG. 6 is a simplified example flowchart of a second load current measurement procedure 600 that may be executed by a control circuit of a load control device (e.g., the control circuit 150 of the LED driver 100 and/or the control circuit 250 of the LED driver 200) for controlling an electrical load (e.g., an LED light source, such as the LED light source 202). For example, the control circuit 250 may execute the second load current measurement procedure 600 to determine an average magnitude of a load current of the electrical load (e.g., the load current $I_{LOAD}$ described herein) using a second load current measurement technique. The load control device may comprise a load regulation circuit (e.g., the load regulation circuit 140 and/or the forward converter 240) which may in turn comprise an output inductor. The output inductor may be magnetically coupled to a winding for generating a sense voltage that may be used to generate a load-current feedback signal. The load-current feedback signal may have a magnitude representative of the magnitude of a load current conducted through the electrical load (e.g., the load-current feedback signal $V_{I-LOAD}$).

The control circuit may execute the second load current measurement procedure 600, for example, periodically at 610 (e.g., when a target power level of the electrical load is below a low threshold). In addition, the second load current measurement procedure 600 may be executed as part of another load current measurement procedure. At 612, the control circuit may drive a filter control signal (e.g., the filter control signal $V_{FC}$) high to enable a filter circuit (e.g., a boxcar filter circuit) to adjust the magnitude of the load-current feedback signal. At 614, the control circuit may wait for a time period (e.g., the filter window time period $T_{FW}$ as shown in FIG. 4), before driving the filter control signal low to disable the filter circuit from adjusting the magnitude of the load-current feedback signal at 616. At 618, the control circuit may determine the average magnitude of the load current $I_{LOAD}$, e.g., by sampling and processing (e.g., scaling) the magnitude of the load-current feedback signal $V_{I-LOAD}$.

Figure 7:
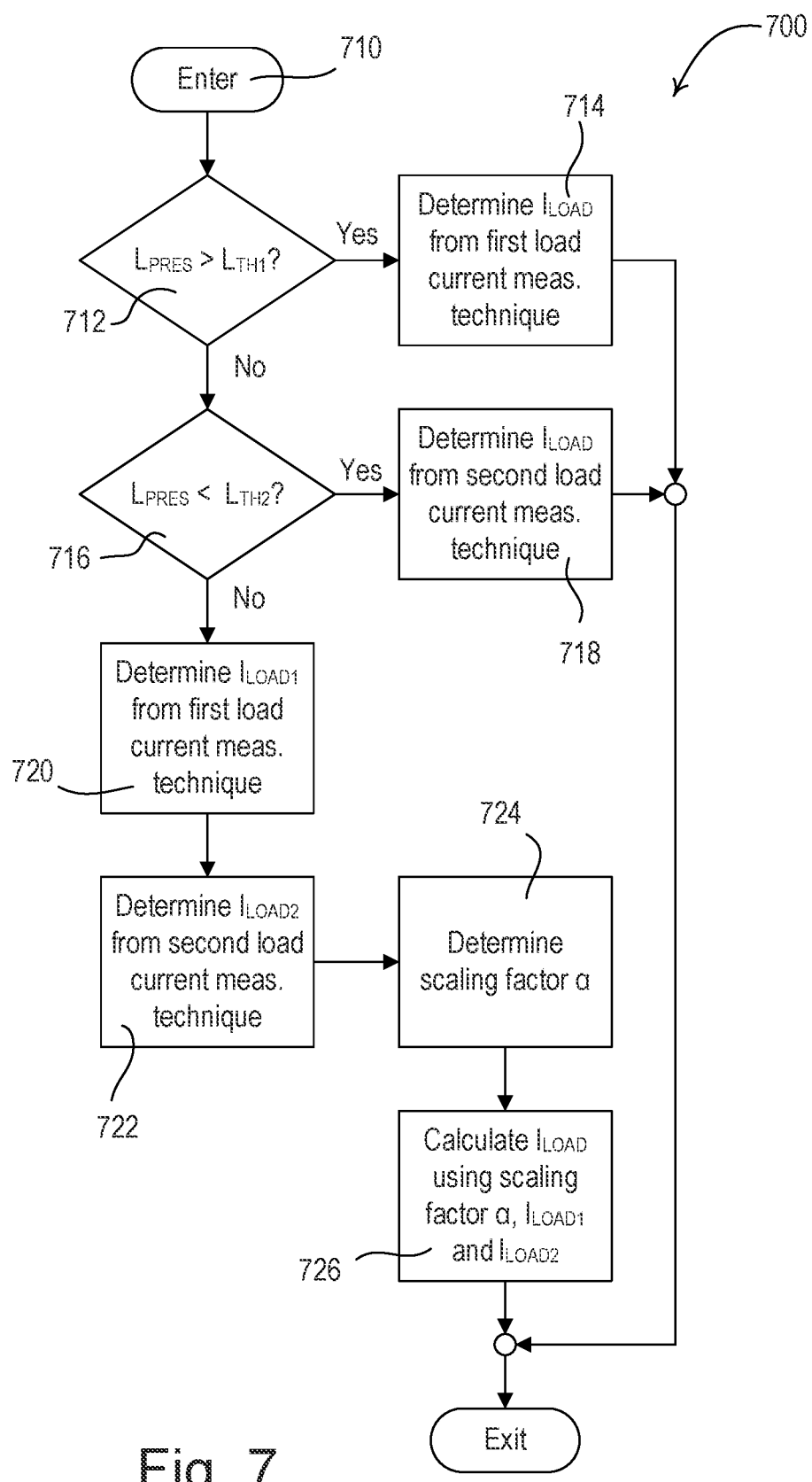

FIG. 7 is a simplified flowchart of a third load current measurement procedure 700 that may be executed by a control circuit of a load control device (e.g., the control circuit 150 of the LED driver 100 and/or the control circuit 250 of the LED driver 200) for controlling an electrical load (e.g., an LED light source, such as the LED light source 202). For example, the control circuit may execute the third load current measurement procedure 600 to determine an average magnitude of a load current of the electrical load (e.g., the load current $I_{LOAD}$ described herein) using multiple load current measurement techniques (e.g., using the first and second load current measurement procedures 500, 600 shown in FIGS. 5 and 6). The load control device may comprise a load regulation circuit (e.g., the load regulation circuit 140 and/or the forward converter 240).

The control circuit may execute the third load current measurement procedure 700, for example, periodically at 710. For example, if the present intensity $L_{PRES}$ of the LED light source is greater than a first threshold intensity $L_{TH1}$ (e.g., approximately 60% of a maximum intensity of the LED light source) at 712, the control circuit may determine the average magnitude of the load current $I_{LOAD}$ using a first load current measurement technique at 714, for example, by executing the first load current measurement procedure 500 (e.g., as shown in FIG. 5). If the present intensity $L_{PRES}$ of the LED light source is less than a second threshold intensity $L_{TH2}$ (e.g., approximately 40% of the maximum intensity of the LED light source) at 716, the control circuit may determine the average magnitude of the load current $I_{LOAD}$ using a second load current measurement technique at 718, for example, by executing the second load current measurement procedure 600 (e.g., as shown in FIG. 6).

If the present intensity $L_{PRES}$ of the LED light source is less than or equal to the first threshold intensity $L_{TH1}$ at 712 and greater than or equal to the second threshold intensity $L_{TH2}$ at 716 (e.g., if the present intensity $L_{PRES}$ of the LED light source is between the first threshold intensity $L_{TH1}$ and the second threshold intensity $L_{TH2}$), the control circuit may use both of the first and second load current measurement techniques and combine the values (e.g., scaled versions of the values) determined from the first and second load current measurement techniques to determine the average magnitude of the load current $I_{LOAD}$. For example, the control circuit may determine a first value $I_{LOAD1}$ for the average magnitude of the load current $I_{LOAD}$ using the first load current measurement technique at 720, and determine a second value $I_{LOAD2}$ for the average magnitude of the load current $I_{LOAD}$ using the second load current measurement technique at 722. At 724, the control circuit may determine a scaling factor α for calculating the average magnitude of the load current $I_{LOAD}$. For example, the first and second values $I_{LOAD1}$, $I_{LOAD2}$ may be blended (e.g., linearly blended) together between the first and second threshold intensities $L_{TH1}$, $L_{TH2}$. The scaling factor α may represent a percentage distance of the present intensity $L_{PRES}$ between the first and second threshold intensities $L_{TH1}$, $L_{TH2}$, e.g., $$\alpha=(L_{PRES}-L_{TH2})/(L_{TH1}-L_{TH2}).$$

At 726, the control circuit may calculate the average magnitude of the load current $I_{LOAD}$ based on two components derived using the first and second load current measurement techniques and by applying the scaling factor α to those components, e.g., $$I_{LOAD}=\alpha \cdot I_{LOAD1}+(1-\alpha) \cdot I_{LOAD2}$$

where $\alpha \cdot I_{LOAD1}$ and $(1-\alpha) \cdot I_{LOAD2}$ may represent respective portions of $I_{LOAD1}$, $I_{LOAD2}$ used to calculate the average magnitude of the load current $I_{LOAD}$. After determining the average magnitude of the load current $I_{LOAD}$ at 714, 718, or 726, the third load current measurement procedure 700 may exit.

Although described with reference to an LED driver, one or more embodiments described herein may be used with other load control devices. For example, one or more of the embodiments described herein may be performed by a variety of load control devices that are configured to control a variety of electrical load types, such as, for example, a LED driver for driving an LED light source (e.g., an LED light engine); a screw-in luminaire including a dimmer circuit and an incandescent or halogen lamp; a screw-in luminaire including a ballast and a compact fluorescent lamp; a screw-in luminaire including an LED driver and an LED light source; a dimming circuit for controlling the intensity of an incandescent lamp, a halogen lamp, an electronic low-voltage lighting load, a magnetic low-voltage lighting load, or another type of lighting load; an electronic switch, controllable circuit breaker, or other switching device for turning electrical loads or appliances on and off; a plug-in load control device, controllable electrical receptacle, or controllable power strip for controlling one or more plug-in electrical loads (e.g., coffee pots, space heaters, other home appliances, and the like); a motor control unit for controlling a motor load (e.g., a ceiling fan or an exhaust fan); a drive unit for controlling a motorized window treatment or a projection screen; motorized interior or exterior shutters; a thermostat for a heating and/or cooling system; a temperature control device for controlling a heating, ventilation, and air conditioning (HVAC) system; an air conditioner; a compressor; an electric baseboard heater controller; a controllable damper; a humidity control unit; a dehumidifier; a water heater; a pool pump; a refrigerator; a freezer; a television or computer monitor; a power supply; an audio system or amplifier; a generator; an electric charger, such as an electric vehicle charger; and an alternative energy controller (e.g., a solar, wind, or thermal energy controller). A single control circuit may be coupled to and/or adapted to control multiple types of electrical loads in a load control system.

The invention claimed is:

1. An electric load control system to determine a current supplied to an electrical load, the system comprising:
    load regulation circuitry that includes:
        a controllably conductive device to receive a bus voltage and provide a high frequency inverter voltage output;
        a transformer to receive the high frequency inverter voltage output via a primary winding and provide via a secondary winding a load voltage to an operatively coupled electric load device; and
        a coil coupled to secondary winding of the transformer, the coil to provide a voltage sense output signal;
    sense circuitry to receive the voltage sense output signal; wherein the sense circuitry includes:
        a current sense circuit to determine a load current feedback signal indicative of a load current provided to the electrical load; and
        a voltage sense circuit to determine a load voltage feedback signal indicative of a load voltage across the electrical load; and
    electric load controller control circuitry operatively coupled to the load regulation circuitry and to the sense circuitry, the electric load controller control circuitry to:
        reversibly transition the controllably conductive device between a conductive state and a non-conductive state to control the power delivered to the operatively coupled electric load device;
        determine a first load current using the determined load current feedback signal; and
        determine a second load current using the determined load voltage feedback signal.

2. The electric load control system of claim 1, the electric load controller control circuitry to further:
    receive an input that includes information indicative of an output luminous intensity of an operatively coupled electric load device that includes one or more light-emitting diodes (LEDs); and
    determine whether the received output luminous intensity of the one or more LEDs is at or above a first threshold luminous intensity;
    responsive to the determination that the received output luminous intensity is at or above the first threshold luminous intensity:
        receive a second voltage sense output signal, the second voltage output signal indicative of a voltage across and a current through a primary winding of the transformer included in the load regulation circuitry;
        determine an input power supplied to the primary winding of the transformer;
        retrieve from memory circuitry data representative of an efficiency of the load regulation circuitry; and
        determine a first average load current delivered to the one or more LEDs using the determined first load current, the retrieved efficiency of the load regulation circuitry, and the determined input power of the load regulation circuitry.

3. The electric load control system of claim 2, the electric load controller control circuitry to further:
    responsive to the determination that the output luminous intensity of the one or more LEDs is at or below a second threshold luminous intensity;
    determine a second average load current using the determined second load current and the load voltage feedback signal.

4. The electric load control system of claim 3, the electric load controller control circuitry to further:
    responsive to the determination that the output luminous intensity of the one or more LEDs is between the first threshold luminous intensity and the second threshold luminous intensity:
        determine a scaling factor; and
        determine the average load current using the determined first average load current, the determined second average load current, and the scaling factor.

5. The electric load control system of claim 2 wherein to determine the first average load current delivered to the one or more LEDs using the determined first load current, the retrieved efficiency of the load regulation circuitry, and the determined input power of the load regulation circuitry, the control circuitry to further:
    determine an input power to the load regulation circuitry as the product of the first load current and the bus voltage;
    multiply the determined input power value of the load regulation circuitry by the retrieved load regulation circuitry efficiency to determine a load power value; and
    determine the first average load current by dividing the determined load power value by the load voltage across the electrical load.

6. An electric load control method of determining a current supplied to an electrical load by a load control device that includes load regulation circuitry operatively coupled to electric load controller control circuitry, the method comprising:
    causing, by the electric load controller control circuitry, the load regulation circuitry to reversibly transition a controllably conductive device between a conductive state and a non-conductive state to control the power delivered to an electric load device;
    receiving, by the electric load controller control circuitry from a sense circuit, a load current feedback signal indicative of an average load current provided to the electric load device, the average load current feedback signal using a first voltage sense output signal generated by a coil inductively coupled to a secondary winding of a transformer included in the load regulation circuitry;

receiving, by the electric load controller control circuitry from the sense circuit, a load voltage feedback signal based on the first voltage sense output signal generated by the coil inductively coupled to the secondary coil of the transformer disposed in the load regulation circuitry;

determining, by the electric load controller control circuitry, a first load current using the received load current feedback signal; and determining, by the electric load controller control circuitry, a second load current using the received load voltage feedback signal.

7. The electric load control method of claim 6 wherein causing the load regulation circuitry to reversibly transition the controllably conductive device between the conductive state and the non-conductive state further comprises:

causing, by the electric load controller control circuitry, the load regulation circuitry to reversibly transition the controllably conductive device between the conductive state and the non-conductive state to control the power delivered to one or more light-emitting diodes (LEDs) to adjust a luminous output provided by the one or more LEDs.

8. The electric load control method of claim 7, further comprising:

determining, by the electric load controller control circuitry, whether the luminous output of the one or more LEDs is at or above a first threshold luminous intensity; and responsive to the determination that the luminous output of the one or more LEDs is at or above the first threshold luminous intensity:

receiving, by the electric load controller control circuitry, a second voltage sense output signal, the second voltage output signal indicative of a voltage across and a current through a primary winding of the transformer disposed in the load regulation circuitry;

determining, by the electric load controller control circuitry, an input power supplied to the transformer disposed in the load regulation circuitry;

retrieving, by the electric load controller control circuitry, data representative of an efficiency of the load regulation circuitry; and determining, by the electric load controller control circuitry, a first average load current delivered to the one or more LEDs using the determined first load current, the retrieved efficiency of the load regulation circuitry, and the input power supplied to the primary coil of the transformer disposed in the load regulation circuitry.

9. The electric load control method of claim 8, further comprising:

determining, by the electric load controller control circuitry, whether the luminous output of the one or more LEDs is at or below of a second threshold luminous intensity; and responsive to the determination that the luminous output of the one or more LEDs is at or below the second threshold luminous intensity:

determining, by the electric load controller control circuitry, a second average load current delivered to the one or more LEDs using the determined second load current and the load voltage feedback signal.

10. The electric load control method of claim 9, further comprising:

determining, by the control circuitry, whether the luminous output of the one or more LEDs is between the first threshold luminous intensity and the second threshold luminous intensity; and responsive to the determination that the luminous output of the one or more LEDs is between the first threshold luminous intensity and the second threshold luminous intensity:

determining, by the electric load controller control circuitry, a scaling factor; and determining, by the control circuitry, the average load current using the determined first average load current, the determined second average load current, and the determined scaling factor.

11. The electric load control method of 8 wherein determining the first average load current delivered to the one or more LEDs using the determined first load current, the retrieved efficiency of the load regulation circuitry, and the input power supplied to the primary coil of the transformer disposed in the load regulation circuitry further comprises:

determining, by the electric load controller control circuitry, the input power to the load regulation circuitry as the product of the first load current and the bus voltage;

multiplying, by the control circuitry, the determined input power value by the retrieved load regulation circuitry efficiency to determine a load power value; and determining, by the control circuitry, the first average load current by dividing the determined load power value by the voltage across the electrical load.

12. A non-transitory, machine-readable, storage device that includes instructions that, when executed by electric load controller control circuitry, causes the electric load controller control circuitry to:

cause load regulation circuitry to reversibly transition a controllably conductive device between a conductive state and a non-conductive state to control the power delivered to an electric load device;

receive, from sense circuitry, a load current feedback signal indicative of an average load current provided to the electric load device, the load current feedback signal determined using a first voltage sense output signal generated via a coil inductively coupled to a secondary winding of a transformer included in the load regulation circuitry;

determine a first load current using the received load current feedback signal; and determine a second load current using the received load voltage feedback signal.

13. The non-transitory, machine-readable, storage device of claim 12 wherein the instructions that cause the electric load controller control circuitry to cause the load regulation circuitry to reversibly transition the controllably conductive device between the conductive state and the non-conductive state further cause the electric load controller control circuitry to:

cause the load regulation circuitry to reversibly transition the controllably conductive device between the conductive state and the non-conductive state to control the power delivered to one or more light-emitting diodes (LEDs) to adjust a luminous output provided by the one or more LEDs.

14. The non-transitory, machine-readable, storage device of claim 13 wherein the instructions, when executed by the electric load controller control circuitry, further cause the electric load controller control circuitry to:
- determine whether the luminous output of the one or more LEDs is at or above a first threshold luminous intensity; and
- responsive to the determination that the luminous output of the one or more LEDs is at or above the first threshold luminous intensity:
  - receive a second voltage sense output signal, the second voltage output signal indicative of a voltage across and a current through a primary winding of the transformer disposed in the load regulation circuitry;
  - determine an input power supplied to the transformer disposed in the load regulation circuitry;
  - retrieve, from memory circuitry, data representative of an efficiency of the load regulation circuitry; and
  - determine a first average load current delivered to the one or more LEDs using the determined first load current, the retrieved efficiency of the load regulation circuitry, the input power supplied to the primary winding of the transformer.

15. The non-transitory, machine-readable, storage device of claim 14 wherein the instructions, when executed by the electric load controller control circuitry, further cause the electric load controller control circuitry to:
- determine whether the luminous output of the one or more LEDs is at or below a second threshold luminous intensity; and
- responsive to the determination that the luminous output of the one or more LEDs is at or below the second threshold luminous intensity:
- determine a second average load current delivered to the one or more LEDs using the determined second load current and the load voltage feedback signal.

16. The non-transitory, machine-readable, storage device of claim 15 wherein the instructions, when executed by the electric load controller control circuitry, further cause the electric load controller control circuitry to:
- determine whether the luminous output of the one or more LEDs is between the first threshold luminous intensity and the second threshold luminous intensity; and
- responsive to the determination that the luminous output of the one or more LEDs is between the first threshold luminous intensity and the second threshold luminous intensity:
  - determine a scaling factor; and
  - determine the average load current using the determined first average load current, the determined second average load current, and the determined scaling factor.

17. The non-transitory, machine-readable, storage device of claim 14 wherein the instructions that cause the electric load controller control circuitry to determine the load current delivered to the one or more LEDs using the determined first load current, the retrieved efficiency of the load regulation circuitry, and the input power supplied to the primary coil of the transformer disposed in the load regulation circuitry further cause the control circuitry to:
- determine the input power to the load regulation circuitry as the product of the first load current and the bus voltage;
- multiply the determined input power value by the retrieved load regulation circuitry efficiency to determine a load power value; and
- determine the first average load current by dividing the determined load power value by the voltage across the electrical load.

* * * * *